(12) United States Patent
Xu

(10) Patent No.: US 11,647,379 B2
(45) Date of Patent: May 9, 2023

(54) METHODS AND APPARATUSES FOR EXPOSURE OF MONITORING EVENT

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 232 days.

(21) Appl. No.: 17/266,796

(22) PCT Filed: Jun. 5, 2019

(86) PCT No.: PCT/CN2019/090183
§ 371 (c)(1),
(2) Date: Feb. 8, 2021

(87) PCT Pub. No.: WO2020/029670
PCT Pub. Date: Feb. 13, 2020

(65) Prior Publication Data
US 2021/0345090 A1 Nov. 4, 2021

(30) Foreign Application Priority Data
Aug. 10, 2018 (WO) ................ PCT/CN2018/099854

(51) Int. Cl.
*H04W 8/18* (2009.01)
*H04W 8/02* (2009.01)
(52) U.S. Cl.
CPC ............. *H04W 8/186* (2013.01); *H04W 8/02* (2013.01)
(58) Field of Classification Search
CPC ................................. H04W 8/186; H04W 8/02
See application file for complete search history.

(56) References Cited

U.S. PATENT DOCUMENTS

| 2015/0078173 | A1 | 3/2015 | Javed |
| 2017/0339534 | A1* | 11/2017 | Bhalla ................. H04W 4/08 |

(Continued)

FOREIGN PATENT DOCUMENTS

| CN | 104349373 A | 2/2015 |
| CN | 106162745 A | 11/2016 |

(Continued)

OTHER PUBLICATIONS

3GPP, "3GPP TS 23.682 V1 5.5.0", 3rd Generation Partnership Project; Technical Specification Group Services and System Aspects; Architecture enhancements to facilitate communications with packet data networks and applications (Release 15), Jun. 2018, 1-125.

(Continued)

*Primary Examiner* — Barry W Taylor
(74) *Attorney, Agent, or Firm* — Christopher & Weisberg, P.A.

(57) ABSTRACT

Methods and apparatuses are disclosed for exposure of monitoring event. According to an embodiment, a network exposure node receives a first request for subscribing to a plurality of monitoring reports for each of a group of terminal devices which include one or more terminal devices having both globally valid identifiers (IDs) and locally valid IDs. The network exposure node obtains, from a subscriber management node, the globally valid IDs and the locally valid IDs of the one or more terminal devices and a correspondence between the globally valid IDs and the locally valid IDs. In response to receiving from a mobility management node a monitoring report for a terminal device in the group of terminal devices, the network exposure node determines, for the terminal device, a current remaining number of monitoring reports based on the obtained IDs and correspondence.

5 Claims, 5 Drawing Sheets

(56) References Cited

U.S. PATENT DOCUMENTS

| | | | |
|---|---|---|---|
| 2018/0324671 A1* | 11/2018 | Palnati | H04L 63/0876 |
| 2021/0029517 A1* | 1/2021 | Zhu | H04L 41/069 |
| 2021/0058766 A1* | 2/2021 | Aravamudhan | H04W 4/14 |
| 2021/0120377 A1* | 4/2021 | Mahalank | H04W 76/11 |
| 2021/0377721 A1* | 12/2021 | Zhou | H04W 8/065 |
| 2022/0104045 A1* | 3/2022 | Kweon | H04W 4/70 |

FOREIGN PATENT DOCUMENTS

| | | |
|---|---|---|
| TW | 201424441 A | 6/2014 |
| WO | 2017126892 A1 | 7/2017 |

OTHER PUBLICATIONS

3GPP, "3GPP TS 29.272 V15.4.0", 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15), Jun. 2018, 1-168.

3GPP, "3GPP TS 29.336 V15.3.0", 3rd Generation Partnership Project; Technical Specification Group Core Network and Terminals; Home Subscriber Server (HSS) diameter interfaces for interworking with packet data networks and applications (Release 15), Jun. 2018, 1-71.

Indian Office Action dated Dec. 14, 2021 for Patent Application No. 202047051040, consisting of 6-pages.

Communication and Supplementary Search Report dated Apr. 4, 2022 for European Patent Application No. EP19848546, consisting of 7-pages.

SA WG2 Meeting #114 Temporary Document S2-162046; Title: New solution: Group-based monitoring configuration; Agenda Item: 6.16; Source: Samsung, Convida Wireless; Work Item/Release: FS_GENCEF/14; Document for: Approval; Date and Location: Apr. 11-15, 2016, Sophia Antipolos, France, consisting of 4-pages.

\* cited by examiner

METHODS AND APPARATUSES FOR EXPOSURE OF MONITORING EVENT

TECHNICAL FIELD

Embodiments of the disclosure generally relate to communication, and, more particularly, to methods and apparatuses for exposure of monitoring event.

BACKGROUND

This section introduces aspects that may facilitate better understanding of the present disclosure. Accordingly, the statements of this section are to be read in this light and are not to be understood as admissions about what is in the prior art or what is not in the prior art.

Currently, 3rd generation partnership project (3GPP) system supports capability exposure towards the third party service capability server (SCS)/application server (AS). For example, in fourth generation (4G) communication technology, network capability exposure to non-3GPP domain is mainly used for machine-type communication (MTC) application and service capability exposure function (SCEF) is a 3GPP node interfacing with external SCS/AS and many southbound 3GPP nodes such as home subscriber server (HSS) and mobility management entity (MME).

Event monitoring is one of the exposure functions providing various user equipment (UE) monitoring. For example, in 3GPP technical specification (TS) 23.682, the following eight events are supported by the 3GPP network. The first event is loss of connectivity, which means the SCS/AS requests to be notified when the 3GPP network detects that the UE is no longer reachable for signalling or user plane communication. The second event is UE reachability, which means the SCS/AS requests to be notified when the UE becomes reachable for sending either short messaging service (SMS) or downlink data to the UE. The third event is location reporting, which means the SCS/AS requests to be notified of the current location or the last known location of the UE. The fourth event is change of international mobile subscriber identification number (IMSI)-international mobile equipment identity (IMEI) association, which means the SCS/AS requests to be notified when the association of an ME (IMEI(SV)) that uses a specific subscription (IMSI) is changed. The term "ME" refers to mobile equipment and the term "SV" refers to software version. The fifth event is roaming status, which means the SCS/AS queries the UE's current roaming status and requests to get notified when the status changes. The sixth event is communication failure, which means the SCS/AS requests to be notified of communication failure events. The seventh event is availability after downlink data notification (DDN) failure, which means the SCS/AS requests to be notified when the UE has become available after a DDN failure. The eighth event is number of UEs present in a geographical area, which means the SCS/AS requests to know how many UEs are in the requested area. Among these events, "location reporting" and "communication failure" can be supported by both HSS/MME/serving GPRS support node (SGSN) and policy and charging rules function (PCRF). The term "GPRS" refers to general packet radio service.

In order to reduce the signalling when a group of UEs is required to have the same type of monitoring event, UE grouping concept is introduced in 3GPP. The third party SCS/AS and 3GPP network are both configured with an external group ID which represents a list of UEs. Thus, the event monitoring function supports monitoring for a single UE (either identified by a mobile subscriber international integrated services digital network (ISDN) number (MSISDN) or an External Identifier) or a group of UEs (identified by an External Group Identifier). The monitoring function also supports a maximum number of monitoring reports desired by the SCS/AS. Such parameter applies for each individual group member UE. For example, if there are 100 UEs in a group and the maximum number of monitoring reports is 10, then totally 1000 reports are expected (i.e. 10 reports per each UE).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for exposure of monitoring event.

According to a first aspect of the disclosure, there is provided a method implemented at a network exposure node. The method comprises receiving a first request for subscribing to a plurality of monitoring reports for each of a group of terminal devices which include one or more terminal devices having both globally valid identifiers (IDs) and locally valid IDs. The method further comprises obtaining, from a subscriber management node, the globally valid IDs and the locally valid IDs of the one or more terminal devices and a correspondence between the globally valid IDs and the locally valid IDs. The method further comprises, in response to receiving from a mobility management node a monitoring report for a terminal device in the group of terminal devices, determining, for the terminal device, a current remaining number of monitoring reports based on the obtained IDs and correspondence.

In an embodiment of the disclosure, the determining the current remaining number of monitoring reports for the terminal device comprises determining whether an ID contained in the monitoring report belongs to the obtained IDs. The determining the current remaining number of monitoring reports for the terminal device further comprises, when determining that the ID contained in the monitoring report belongs to the obtained IDs, determining whether a remaining number of monitor reports has been previously determined for another ID that corresponds to the ID according to the obtained correspondence. The determining the current remaining number of monitoring reports for the terminal device further comprises, when determining that the remaining number of monitoring reports has been previously determined for the another ID, decrementing the previously determined remaining number of monitoring reports by one as the current remaining number of monitoring reports.

In an embodiment of the disclosure, the obtaining the IDs and the correspondence comprises sending, to the subscriber management node, a second request for subscribing to the plurality of monitoring reports for each of the group of terminal devices. The obtaining the IDs and the correspondence further comprises receiving, from the subscriber management node, a list of the globally valid IDs and the locally valid IDs of the one or more terminal devices. The list indicates the correspondence between the globally valid IDs and the locally valid IDs.

In an embodiment of the disclosure, the second request is a Monitoring Request message and a number of the plurality of monitoring reports is indicated by an information element called maximum number of reports. The list is received in a Monitoring Response message.

In an embodiment of the disclosure, the globally valid ID of a terminal device is an MSISDN of the terminal device and the locally valid ID of a terminal device is an External Identifier of the terminal device.

According to a second aspect of the disclosure, there is provided a method implemented at a subscriber management node. The method comprises receiving, from a network exposure node, a request for subscribing to a plurality of monitoring reports for each of a group of terminal devices which include one or more terminal devices having both globally valid IDs and locally valid IDs. The method further comprises providing, to the network exposure node, the globally valid IDs and the locally valid IDs of the one or more terminal devices and a correspondence between the globally valid IDs and the locally valid IDs.

In an embodiment of the disclosure, the providing the IDs and the correspondence to the network exposure node comprises sending, to the network exposure node, a list of the globally valid IDs and the locally valid IDs of the one or more terminal devices. The list indicates the correspondence between the globally valid IDs and the locally valid IDs.

In an embodiment of the disclosure, the request is a Monitoring Request message and a number of the plurality of monitoring reports is indicated by an information element called maximum number of reports. The list is sent in a Monitoring Response message.

According to a third aspect of the disclosure, there is provided a network exposure node. The network exposure node comprises at least one processor and at least one memory. The at least one memory contains instructions executable by the at least one processor, whereby the network exposure node is operative to receive a first request for subscribing to a plurality of monitoring reports for each of a group of terminal devices which include one or more terminal devices having both globally valid IDs and locally valid IDs. The network exposure node is further operative to obtain, from a subscriber management node, the globally valid IDs and the locally valid IDs of the one or more terminal devices and a correspondence between the globally valid IDs and the locally valid IDs. The network exposure node is further operative to, in response to receiving from a mobility management node a monitoring report for a terminal device in the group of terminal devices, determine, for the terminal device, a current remaining number of monitoring reports based on the obtained IDs and correspondence.

In an embodiment of the disclosure, the network exposure node is operative to perform the method according to the above first aspect.

According to a fourth aspect of the disclosure, there is provided a subscriber management node. The subscriber management node comprises at least one processor and at least one memory. The at least one memory contains instructions executable by the at least one processor, whereby the subscriber management node is operative to receive, from a network exposure node, a request for subscribing to a plurality of monitoring reports for each of a group of terminal devices which include one or more terminal devices having both globally valid IDs and locally valid IDs. The subscriber management node is further operative to provide, to the network exposure node, the globally valid IDs and the locally valid IDs of the one or more terminal devices and a correspondence between the globally valid IDs and the locally valid IDs.

In an embodiment of the disclosure, the subscriber management node is operative to perform the method according to the above second aspect.

According to a fifth aspect of the disclosure, there is provided a computer program product. The computer program product comprises instructions which when executed by at least one processor, cause the at least one processor to perform the method according to any one of the above first and second aspects.

According to a sixth aspect of the disclosure, there is provided a computer readable storage medium. The computer readable storage medium comprises instructions which when executed by at least one processor, cause the at least one processor to perform the method according to any one of the above first and second aspects.

According to a seventh aspect of the disclosure, there is provided a network exposure node. The network exposure node comprises a reception module for receiving a first request for subscribing to a plurality of monitoring reports for each of a group of terminal devices which include one or more terminal devices having both globally valid IDs and locally valid IDs. The network exposure node further comprises an obtaining module for obtaining, from a subscriber management node, the globally valid IDs and the locally valid IDs of the one or more terminal devices and a correspondence between the globally valid IDs and the locally valid IDs. The network exposure node further comprises a determination module for, in response to receiving from a mobility management node a monitoring report for a terminal device in the group of terminal devices, determining, for the terminal device, a current remaining number of monitoring reports based on the obtained IDs and correspondence.

According to an eighth aspect of the disclosure, there is provided a subscriber management node. The subscriber management node comprises a reception module for receiving, from a network exposure node, a request for subscribing to a plurality of monitoring reports for each of a group of terminal devices which include one or more terminal devices having both globally valid IDs and locally valid IDs. The subscriber management node further comprises a provision module for providing, to the network exposure node, the globally valid IDs and the locally valid IDs of the one or more terminal devices and a correspondence between the globally valid IDs and the locally valid IDs.

According to some embodiment(s) of the disclosure, an accurate event monitoring can be achieved when a number of monitoring reports is expected for a group of terminal devices.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1:
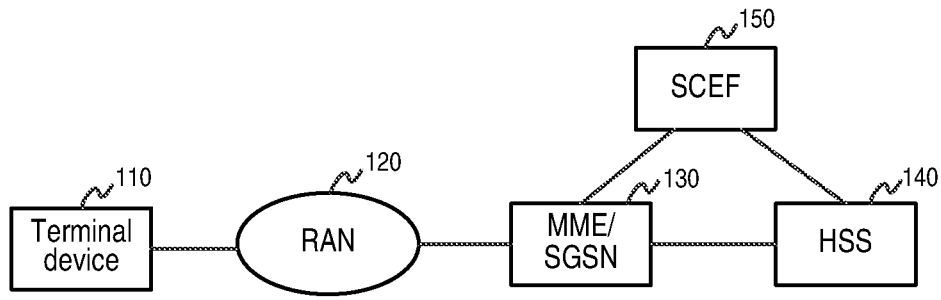
FIG. 1 is a diagram showing an exemplary communication system into which an embodiment of the disclosure is applicable.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, the monitoring function supports a maximum number of monitoring reports desired by the SCS/AS. According to current specifications, if the monitoring is for a group of UEs, SCEF will receive "number of UEs" from HSS during event configuration (as described in step 4a of 5.6.1.1 of TS 23.682) in order to track how many reports will be received for such group of UEs and terminate the event configuration if all reports for all group member UEs are received. However, how to count the exact number of desired reports is an issue because of the following reasons.

3GPP TS 29.272 has specified one feature called "External-Identifier" which is negotiated during update location procedure (update location request (ULR)/update location answer (ULA)) to support the UE identified by the External Identifier. Specifically, during UE update location procedure, SGSN/MME negotiates the supported features with HSS, with Diameter attribute value pair (AVP) indicating supported features according to table 7.3.10/1 and 7.3.10/2. The "External-Identifier" feature is one of them. This implies that different SGSN/MME may have different support for "External-Identifier" feature.

Due to the fact that different SGSNs/MMEs have different capabilities to support the "External-Identifier" feature, when a UE moves between different SGSNs/MMEs, the report may include either MSISDN or External-Identifier. Thus, the SCEF does not know whether the UE reports are of the same UE or not, since the SCEF does not hold the mapping between MSISDN and External-Identifier for the same UE. This may lead to incorrect reports (e.g. double reports or missed reported for some UEs) under certain circumstances due to unclear number of remaining reports.

The present disclosure proposes improved solutions for exposure of monitoring event. Hereinafter, the solutions will be described in detail with reference to FIGS. 1-9.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future.

In the following, different terms may refer to a same or similar network function or network node with the same or similar functionality in different communication systems. Thus, the specific terms used herein do not limit the present disclosure only to the communication system related to the specific terms, which however can be more generally applied to other communication systems.

FIG. 1 is a diagram showing an exemplary communication system into which an embodiment of the disclosure is applicable. As shown, the communication system comprises a terminal device 110, a radio access network (RAN) 120, a mobility management entity (MME)/serving GPRS support node (SGSN) 130, a home subscriber server (HSS) 140 and a service capability exposure function (SCEF) 150. Note that the number of each entity mentioned above may be more than one.

The terminal device 110 can communicate through a radio access communication link with the RAN 120. The communication may be performed according to any suitable communication protocols. The terminal device may also be referred to as, for example, mobile station, mobile unit, subscriber station, user equipment (UE), access terminal, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 120 may include, for example, a universal mobile telecommunications system (UMTS) terrestrial RAN (UTRAN), a global system for mobile communication (GSM)/enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to terminal devices that are within their respective communication service cells. The E-UTRAN can include radio base station nodes (eNodeBs) that can provide the combined functionality of the RNC nodes and base stations of the UTRAN and the GERAN.

The MME/SGSN 130 means either the MME or the SGSN or both. The MME is a core network node in evolved packet system (EPS) and can carry out mobility management of the terminal device 110, bearer management, and the like. The SGSN is a core network node in the UMTS and has a user-plane function and a control-plane function. The user-plane function of the SGSN can transfer user data packets of the terminal device 110 between the RAN 120 and a gateway node such as GPRS support node (GGSN). The control-plane function of the SGSN can carry out mobility management of the terminal device 110, bearer management, and the like.

The HSS 140 is a control-plane node in the core network of 3GPP public land mobile network (PLMN) and can manage subscriber information of the terminal device 110.

The SCEF 150 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The HSS 140 may communicate with the SCEF 150 via S6t interface.

It should be noted that the MME/SGSN 130, the HSS 140 and the SCEF 150 are merely exemplary examples of the components in the communication system and may be replaced by components with similar functionalities. For example, in fifth generation (5G) core network (CN), the MME/SGSN may be replaced by an access and mobility management function (AMF), the HSS may be replaced by a unified data management (UDM), and the SCEF may be replaced by a network exposure function (NEF).

Figure 2:
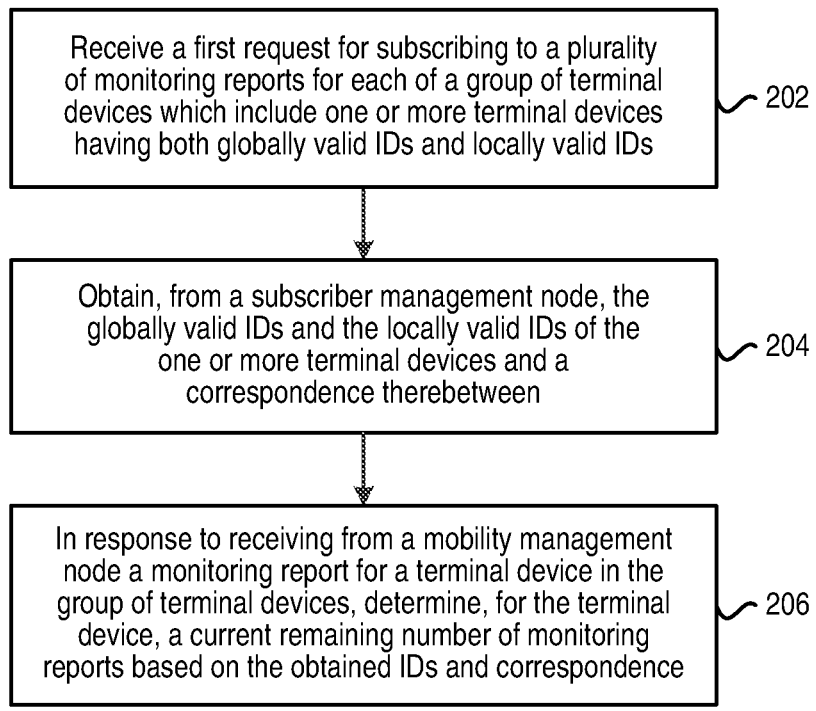
FIG. 2 is a flowchart illustrating a method implemented at a network exposure node according to an embodiment of the disclosure.
Figure 3:
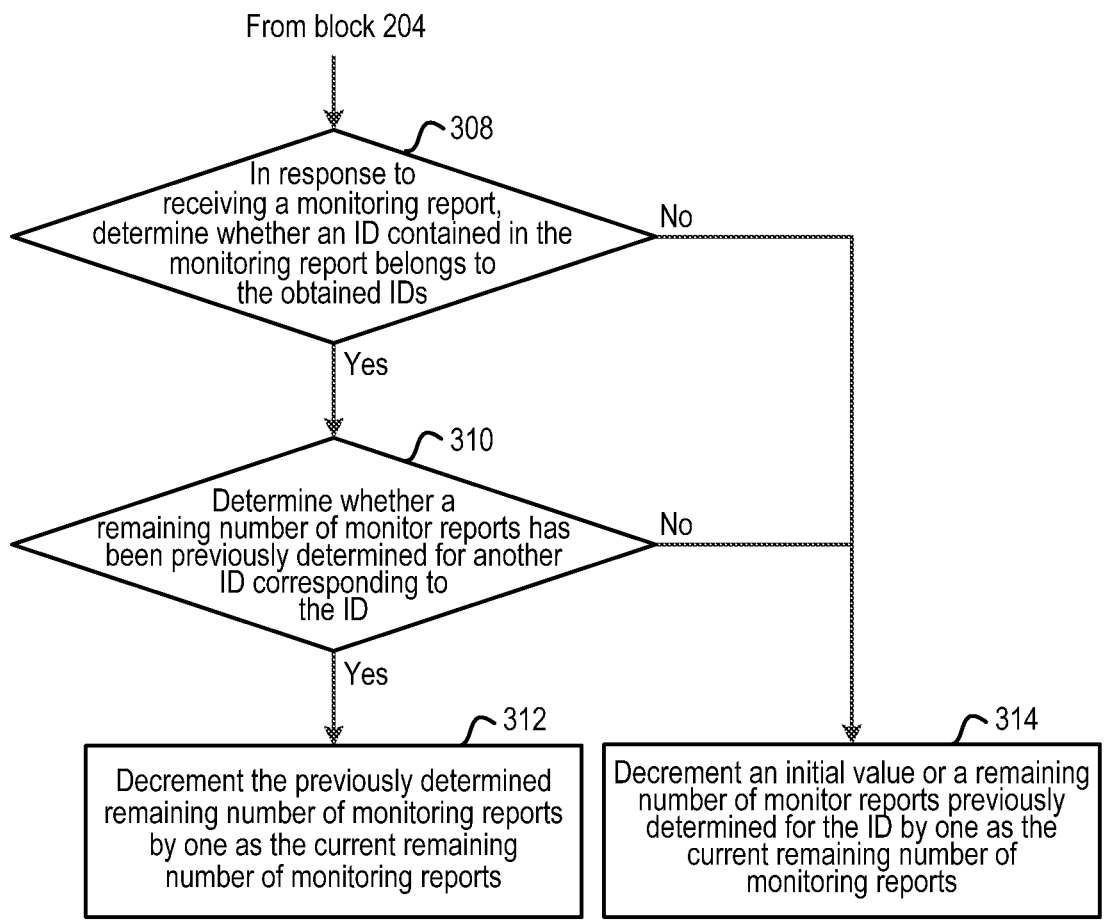
FIG. 3 is a flowchart for explaining the method of FIG. 2.
Figure 4:
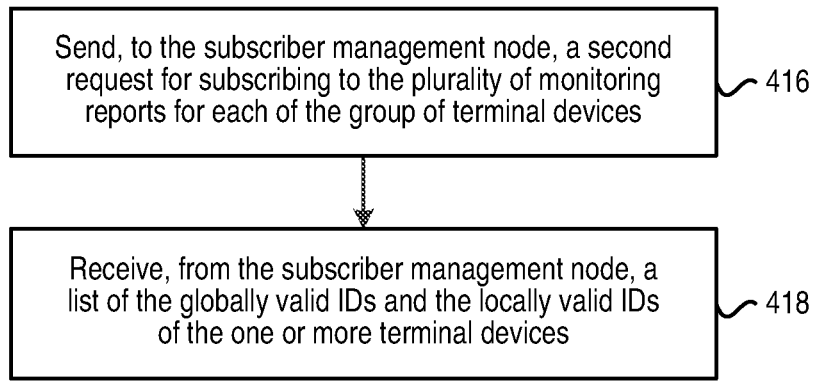
FIG. 4 is a flowchart for explaining the method of FIG. 2.

FIG. 2 is a flowchart illustrating a method implemented at a network exposure node according to an embodiment of the disclosure. For example, the network exposure node may take the form of an SCEF, an NEF, or any other entity having similar functionality of exposing services and capabilities provided by 3GPP networks. At block 202, the network exposure node receives a first request for subscribing to a plurality of monitoring reports for each of a group of terminal devices which include one or more terminal devices having both globally valid identifiers (IDs) and locally valid IDs. For example, the first request may be received from a requesting server such as a service capability server (SCS) or an application server (AS). The first request may include at least identification information about the group of terminal devices and the number of the plurality of monitoring reports. By means of the identification information, both the requesting server and a subscriber management node (e.g. HSS, UDM, or the like) can know the members of the group. The number of the plurality of monitoring reports may be specified by the requesting server. Note that the first request may include other information depending on the actual application scenario.

As an example, the first request may be a Monitoring Request message, the identification information about the group may be an external group ID for identifying the group, and the number of the plurality of monitoring reports may be indicated by an information element called maximum number of reports. For instance, the globally valid ID of a terminal device may be a mobile subscriber international ISDN number (MSISDN) of the terminal device. The locally valid ID of a terminal device may refer to an ID which is supported by some mobility management nodes (e.g. MME, SGSN, AMF, or the like) but not supported by some other mobility management nodes. For instance, the locally valid ID of a terminal device may be an External Identifier of the terminal device.

At block 204, the network exposure node obtains, from a subscriber management node, the globally valid IDs and the locally valid IDs of the one or more terminal devices and a correspondence between the globally valid IDs and the locally valid IDs. In this way, accurate monitoring count can be supported since the obtained IDs and correspondence can help the network exposure node to maintain the correct remaining number of reports for a group of UEs in event monitoring. For example, the subscriber management node may take the form of an HSS, a UDM, or any other entity having similar functionality of managing subscriber information of a terminal device. Block 204 may be implemented as blocks 416-418 of FIG. 4. At block 416, the network exposure node sends, to the subscriber management node, a second request for subscribing to the plurality of monitoring reports for each of the group of terminal devices. The second request may include at least the identification information about the group of terminal devices and the number of the plurality of monitoring reports. The identification information and the number of reports may be extracted from the first request. Similar to the first request, depending on the actual application scenario, the second request may include other information which may be the same as or different than that included in the first request. At block 418, the network exposure node receives, from the subscriber management node, a list of the globally valid IDs and the locally valid IDs of the one or more terminal devices. The list indicates the correspondence between the globally valid IDs and the locally valid IDs. For example, the list may include, for each terminal device in the one or more terminal devices, a value pair composed of the globally valid ID and the locally valid ID belonging to the terminal device. As an example, the list may be received in a Monitoring Response message.

At block 206, in response to receiving from a mobility management node a monitoring report for a terminal device in the group of terminal devices, the network exposure node determines, for the terminal device, a current remaining number of monitoring reports based on the obtained IDs and correspondence. In this way, in case the received monitoring reports include either globally valid IDs or locally valid IDs, the network exposure node can know whether some monitoring reports are of the same terminal device or not, such that accurate event monitoring can be achieved.

For example, the mobility management node may take the form of an MME, an SGSN, an AMF, or any other entity having similar functionality of carrying out mobility management of a terminal device. Block 206 may be implemented as blocks 308-314 of FIG. 3. At block 308, in response to receiving from a mobility management node a monitoring report for a terminal device in the group of terminal devices, the network exposure node determines whether an ID contained in the monitoring report belongs to the obtained IDs. If it is determined at block 308 that the ID contained in the monitoring report belongs to the obtained IDs, the network exposure node determines, at block 310, whether a remaining number of monitor reports has been previously determined for another ID that corresponds to the ID according to the obtained correspondence. If it is determined at block 310 that the remaining number of monitoring reports has been previously determined for the another ID, the network exposure node decrements the previously determined remaining number of monitoring reports by one as the current remaining number of monitoring reports at block 312.

On the other hand, if it is determined at block 308 that the ID contained in the monitoring report does not belong to the obtained IDs, or if it is determined at block 310 that no remaining number of monitoring reports has been previously determined for another ID corresponding to the ID, the network exposure node decrements an initial value or a remaining number of monitor reports previously determined for the ID by one as the current remaining number of monitoring reports at block 314. The initial value may be equal to the number of reports which is indicated in the first request. When a monitoring report is received for a terminal device for the first time, the initial value is used. In other cases, the previously determined remaining number of monitor reports is used.

Figure 5:
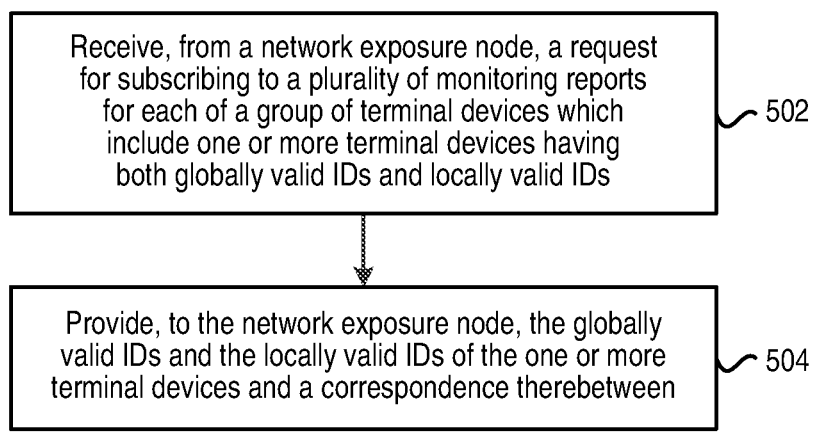
FIG. 5 is a flowchart illustrating a method implemented at a subscriber management node according to an embodiment of the disclosure.

FIG. 5 is a flowchart illustrating a method implemented at a subscriber management node according to an embodiment of the disclosure. As described above, the subscriber management node may take the form of an HSS, a UDM, or any other entity having similar functionality of managing subscriber information of a terminal device. At block 502, the subscriber management node receives, from a network exposure node, a request for subscribing to a plurality of monitoring reports for each of a group of terminal devices which include one or more terminal devices having both globally valid IDs and locally valid IDs. Block 502 corresponds to block 416 and its details are omitted here. At block 504, the subscriber management node provides, to the network exposure node, the globally valid IDs and the locally valid IDs of the one or more terminal devices and a correspondence between the globally valid IDs and the locally valid IDs. Note that the globally valid IDs and the locally valid IDs of the one or more terminal devices and the correspondence between the globally valid IDs and the locally valid IDs are provided when the number of the plurality of monitoring reports is greater than one. As an example, the subscriber management node may send, to the network exposure node, a list of the globally valid IDs and the locally valid IDs of the one or more terminal devices. The list indicates the correspondence between the globally valid IDs and the locally valid IDs. This example corresponds to block 418. It should be noted that two blocks shown in succession in the figures may, in fact, be executed substantially concurrently, or the blocks may sometimes be executed in the reverse order, depending upon the functionality involved.

Figure 6:
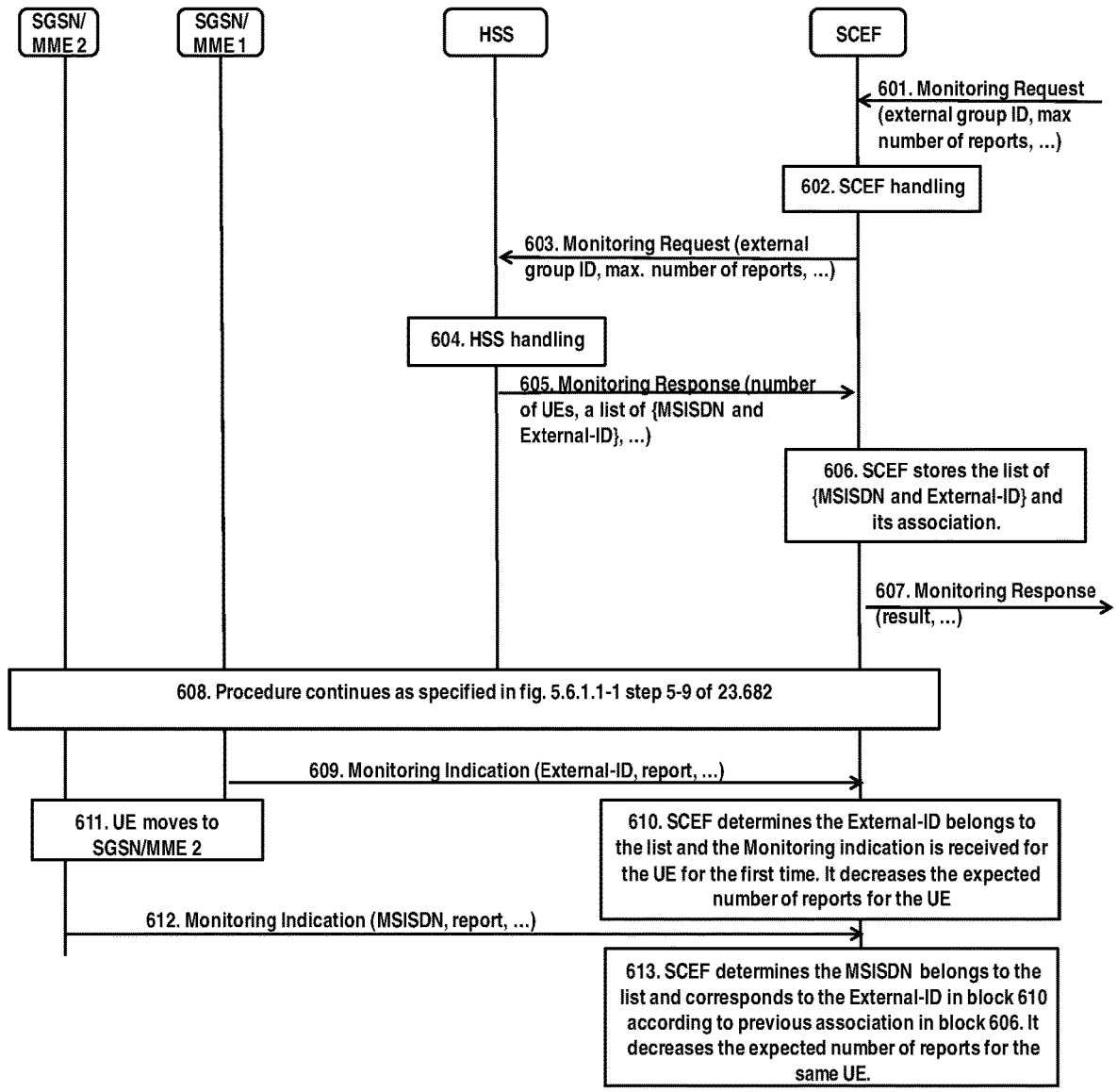
FIG. 6 is a flowchart illustrating an exemplary process according to an embodiment of the disclosure.

FIG. 6 is a flowchart illustrating an exemplary process according to an embodiment of the disclosure. In this exemplary process, the network exposure node is an SCEF, the subscriber management node is an HSS, and there are two mobility management nodes which are SGSN/MME 1 and SGSN/MME 2. At block 601, the SCEF receives from a requesting server a Monitoring Request including at least an external group ID and a maximum number of reports. The requesting server may be an SCS/AS which may specify the external group ID and the maximum number of reports. Block 601 may be implemented in a way similar to step 1 in FIG. 5.6.1.1-1 of 3GPP TS 23.682, which is incorporated herein by reference in its entirety. At block 602, the SCEF handles the received Monitoring Request. Block 602 may be implemented in a way similar to step 2 in FIG. 5.6.1.1-1 of 3GPP TS 23.682. At block 603, the SCEF sends to the HSS a Monitoring Request including at least the external group ID and the maximum number of reports. Block 603 may be implemented in a way similar to step 3 in FIG. 5.6.1.1-1 of 3GPP TS 23.682. At block 604, the HSS handles the received Monitoring Request. Block 604 may be implemented in a way similar to step 4 in FIG. 5.6.1.1-1 of 3GPP TS 23.682.

At block 605, the HSS sends a Monitoring Response to the SCEF over S6t interface. The Monitoring Response includes at least the number of UEs and a list of attribute value pairs (AVPs) each of which is composed of {MSISDN and External-ID} belonging to a UE. By adding this list into the Monitoring Response (which is a configuration information answer (CIA) Diameter command), an enhancement is made over S6t interface to support accurate monitoring count since it can help the SCEF to maintain the correct remaining number of reports for a group of UEs in event monitoring. The term "Diameter" refers to an authentication, authorization, and accounting protocol for computer networks. Note that for a group of UEs, this list is sent only for UEs having both MSISDN and External-ID configured in the HSS if the maximum number of reports is greater than one. Also note that when the principle of the present disclosure is applied to 5G CN, the Diameter command and AVPs may be replaced by corresponding messages and information elements defined in 5G. At block 606, the SCEF stores the list of AVPs and the association (or correspondence) indicated by the AVPs.

At block 607, the SCEF sends a Monitoring Response to the requesting server. Block 607 may be implemented in a way similar to step 4b in FIG. 5.6.1.1-1 of 3GPP TS 23.682. At block 608, the process continues as specified in steps 5-9 in FIG. 5.6.1.1-1 of 3GPP TS 23.682. At block 609, the SGSN/MME 1 sends to the SCEF a Monitoring Indication including at least an External-ID and a report. Suppose the UE having the External-ID also has an MSISDN and this Monitoring Indication is received for the UE for the first time. Then, at block 610, the SCEF determines that the External-ID belongs to the list stored in block 606 and the Monitoring Indication is received for the UE for the first time (which means an expected number of reports has not been previously calculated for the MSISDN corresponding to the External-ID). Thus, the SCEF decreases the expected number of reports for the UE corresponding to the External-ID. Since the Monitoring Indication is received for the UE for the first time, before the decreasing, the expected number of reports equals to the maximum number of reports in block 601. After the decreasing, the expected number of reports equals to the maximum number of reports minus one. That is, the expected number of reports corresponds to the remaining number of monitoring reports mentioned above.

At block 611, the same UE moves to the SGSN/MME 2. At block 612, the SGSN/MME 2 sends to the SCEF a Monitoring Indication including at least an MSISDN and a report. At block 613, the SCEF determines that the MSISDN belongs to the list stored in block 606 and corresponds to the External-ID in block 610 according to previous association stored at block 606 (which means an expected number of reports has been previously calculated for the External-ID corresponding to the MSISDN). In other words, the SCEF knows the reports sent in blocks 609 and 612 are for the same UE due to the previous association stored at block 606. Thus, the SCEF decreases the expected number of reports for the same UE. Specifically, the expected number of reports calculated in block 610 is decreased by one. In this way, an accurate event monitoring can be enabled within the 3GPP system when a number of monitoring reports is expected for a group of UEs.

Figure 7:
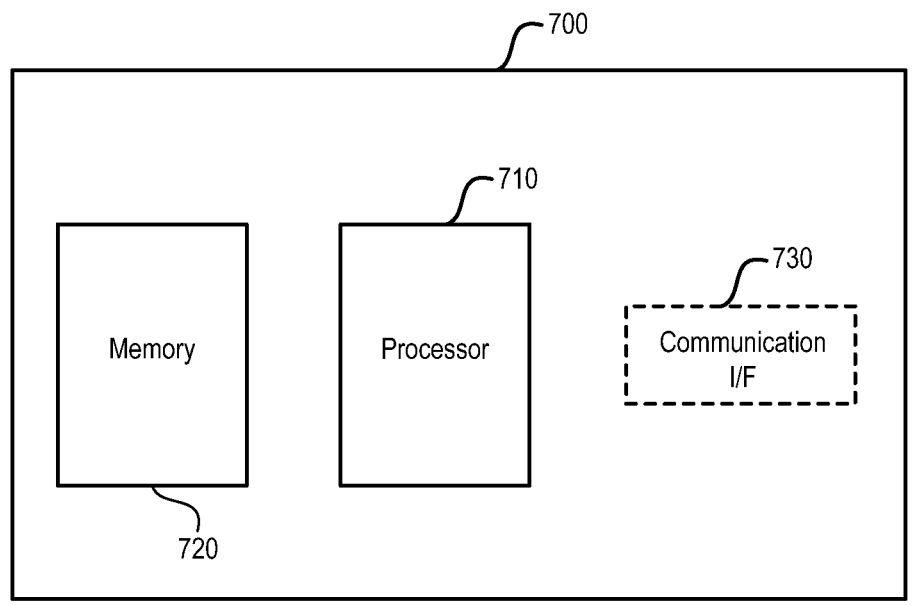
FIG. 7 is a block diagram showing an apparatus suitable for use in practicing some embodiments of the disclosure.

FIG. 7 is a block diagram showing an apparatus suitable for use in practicing some embodiments of the disclosure. For example, any one of the network exposure node and the subscriber management node described above may be implemented through the apparatus 700. As shown, the apparatus 700 may include a processor 710, a memory 720 that stores a program, and optionally a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memories, magnetic memory devices and systems, optical memory devices and systems, fixed memories and removable memories. The processor 710 may be of any type suitable to the local technical environment, and may include one or more of general purpose computers, special purpose computers, microprocessors, digital signal processors (DSPs) and processors based on multi-core processor architectures, as non-limiting examples.

Figure 8:
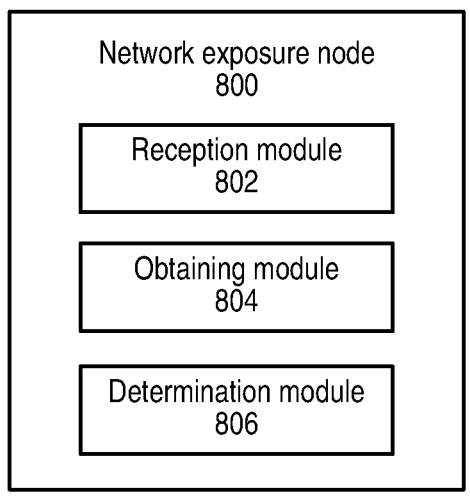
FIG. 8 is a block diagram showing a network exposure node according to an embodiment of the disclosure.

FIG. 8 is a block diagram showing a network exposure node according to an embodiment of the disclosure. As shown, the network exposure node 800 may comprise a reception module 802, an obtaining module 804 and a determination module 806. The reception module 802 may be configured to receive a first request for subscribing to a plurality of monitoring reports for each of a group of terminal devices which include one or more terminal devices having both globally valid IDs and locally valid IDs, as described above with respect to block 202. The obtaining module 804 may be configured to obtain, from a subscriber management node, the globally valid IDs and the locally valid IDs of the one or more terminal devices and a correspondence between the globally valid IDs and the locally valid IDs, as described above with respect to block 204. The determination module 806 may be configured to, in response to receiving from a mobility management node a monitoring report for a terminal device in the group of terminal devices, determine, for the terminal device, a current remaining number of monitoring reports based on the obtained IDs and correspondence, as described above with respect to block 206.

Figure 9:
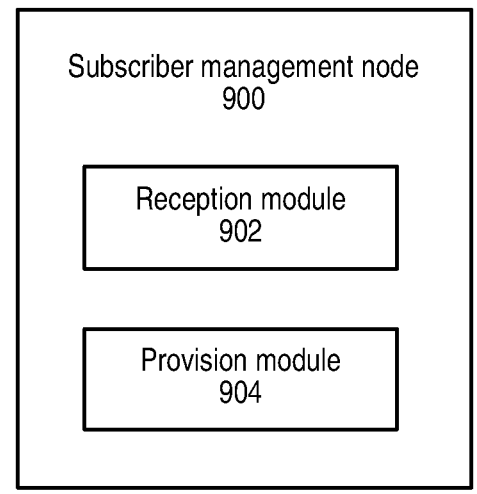
FIG. 9 is a block diagram showing a subscriber management node according to an embodiment of the disclosure.

FIG. 9 is a block diagram showing a subscriber management node according to an embodiment of the disclosure. As shown, the subscriber management node 900 may comprise a reception module 902 and a provision module 904. The reception module 902 may be configured to receive, from a network exposure node, a request for subscribing to a plurality of monitoring reports for each of a group of terminal devices which include one or more terminal devices having both globally valid IDs and locally valid IDs, as described above with respect to block 502. The provision module 904 may be configured to provide, to the network exposure node, the globally valid IDs and the locally valid IDs of the one or more terminal devices and a correspondence between the globally valid IDs and the locally valid IDs, as described above with respect to block 504. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a network exposure node, the method comprising:
receiving a first request for subscribing to a plurality of monitoring reports for each of a group of terminal devices which include one or more terminal devices having both globally valid identifiers (IDs) and locally valid IDs;
obtaining, from a subscriber management node, the globally valid IDs and the locally valid IDs of the one or more terminal devices and a correspondence between the globally valid IDs and the locally valid IDs; and
in response to receiving from a mobility management node a monitoring report for a terminal device in the group of terminal devices, determining, for the terminal device, a current remaining number of monitoring reports based on the obtained IDs and correspondence, the determining the current remaining number of monitoring reports for the terminal device comprises:
determining whether an ID contained in the monitoring report belongs to the obtained IDs;
when determining that the ID contained in the monitoring report belongs to the obtained IDs, determining whether a remaining number of monitor reports has been previously determined for another ID that corresponds to the ID according to the obtained correspondence; and
when determining that the remaining number of monitoring reports has been previously determined for the another ID, decrementing the previously determined remaining number of monitoring reports by one as the current remaining number of monitoring reports.

2. The method according to claim 1, wherein the obtaining the IDs and the correspondence comprises:
sending, to the subscriber management node, a second request for subscribing to the plurality of monitoring reports for each of the group of terminal devices; and
receiving, from the subscriber management node, a list of the globally valid IDs and the locally valid IDs of the one or more terminal devices, the list indicating the correspondence between the globally valid IDs and the locally valid IDs.

3. The method according to claim 2, wherein the second request is a Monitoring Request message and a number of the plurality of monitoring reports is indicated by an information element called maximum number of reports; and
wherein the list is received in a Monitoring Response message.

4. The method according to claim 1, wherein the globally valid ID of a terminal device is a mobile subscriber international ISDN number, MSISDN, of the terminal device and the locally valid ID of a terminal device is an External Identifier of the terminal device.

5. A network exposure node comprising:
at least one processor; and
at least one memory, the at least one memory containing instructions executable by the at least one processor, whereby the network exposure node is operative to:
receive a first request for subscribing to a plurality of monitoring reports for each of a group of terminal devices which include one or more terminal devices having both globally valid identifiers (IDs) and locally valid IDs;
obtain, from a subscriber management node, the globally valid IDs and the locally valid IDs of the one or more terminal devices and a correspondence between the globally valid IDs and the locally valid IDs; and
in response to receiving from a mobility management node a monitoring report for a terminal device in the group of terminal devices, determine, for the terminal device, a current remaining number of monitoring reports based on the obtained IDs and correspondence,
determining the current remaining number of monitoring reports for the terminal device comprises:
determining whether an ID contained in the monitoring report belongs to the obtained IDs;
when determining that the ID contained in the monitoring report belongs to the obtained IDs, determine whether a remaining number of monitor reports has been previously determined for another ID that corresponds to the ID according to the obtained correspondence; and
when determining that the remaining number of monitoring reports has been previously determined for the another ID, decrement the previously determined remaining number of monitoring reports by one as the current remaining number of monitoring reports.

* * * * *